Nov. 29, 1949  R. P. NEWICK  2,489,804
HALFTONE DIAPHRAGM CONTROL
Original Filed Feb. 23, 1942  3 Sheets-Sheet 3

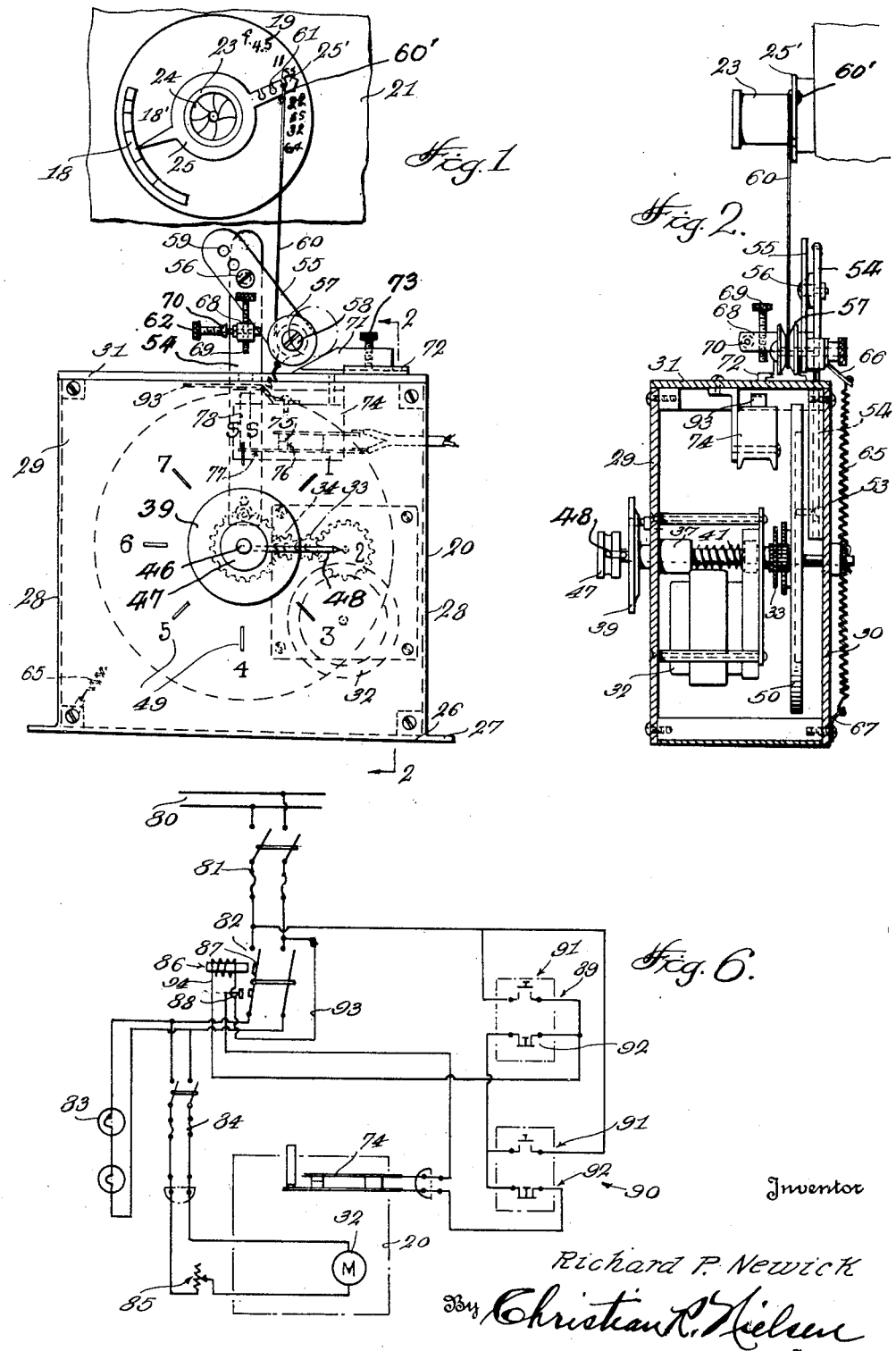

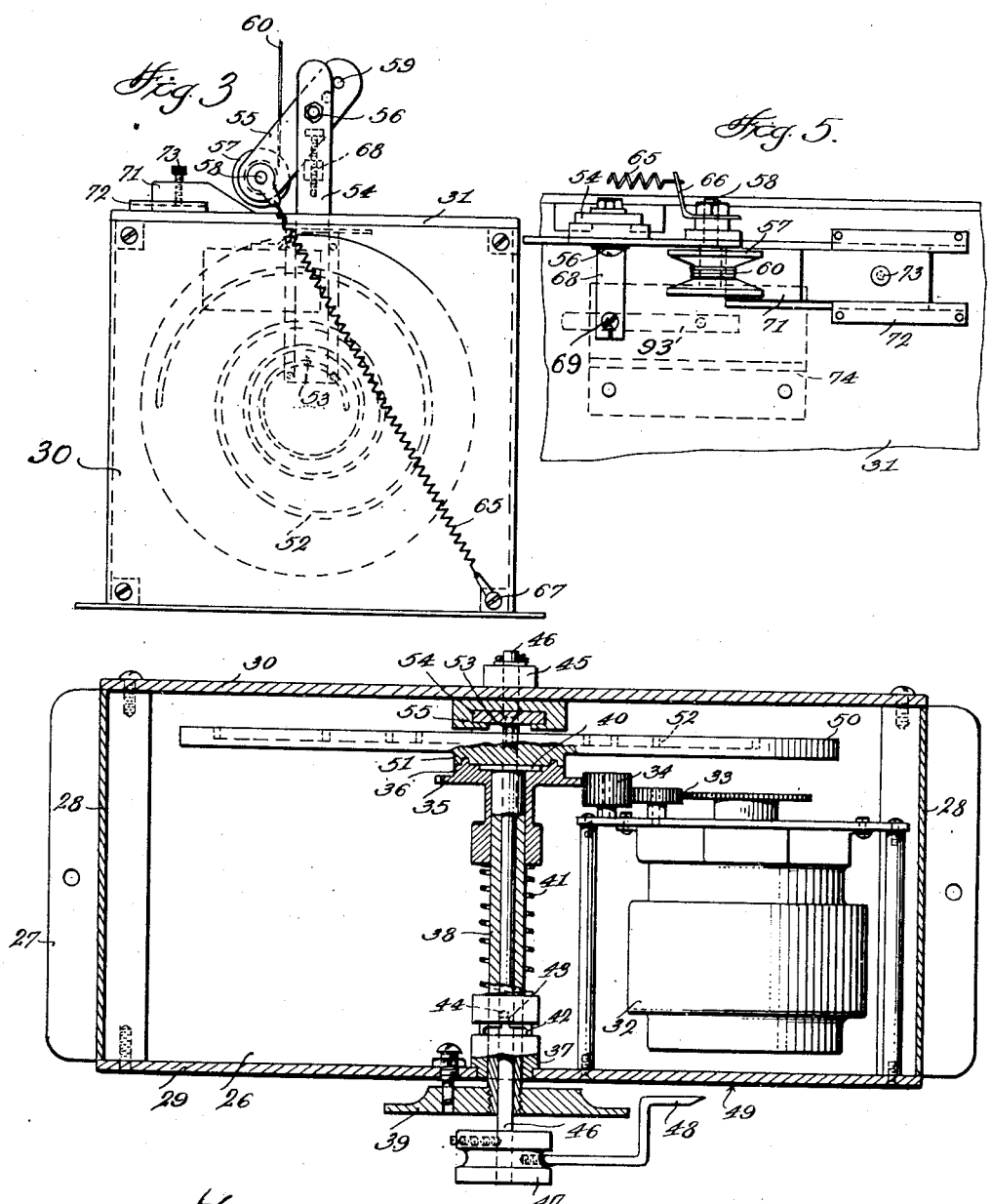

Inventor
Richard P. Newick,
By Christian L. Nielsen.
Attorney

Patented Nov. 29, 1949

2,489,804

UNITED STATES PATENT OFFICE 2,489,804

HALFTONE DIAPHRAGM CONTROL

Richard P. Newick, deceased, late of Rutherford, N. J., by Evelyn C. Newick, executrix, Grants Pass, Oreg.

Substituted for application Serial No. 432,072, February 23, 1942. This application May 21, 1946, Serial No. 671,299

3 Claims. (Cl. 95—64)

This application is a substitute for abandoned application, Serial No. 432,072, filed February 23, 1942.

The invention relates to apparatus for controlling the time and character of exposure in photographic processes, and more specifically is designed to control the proportion of total exposure given at each of certain selected lens apertures. The starting and stopping aperture of the lens are the only ones selected for size; all other change automatically at variable speeds as the control operates.

The particular application of the invention lies in the field of photochemical reproduction, and particularly to the half-tone processes in which an image made up of dots of various sizes is produced by means of exposure of a sensitive material under a half-tone screen. The dot image is produced due to the exposure gradient in the shadow of the elements of the screen, and since the sharpness and size of this shadow is dependent on the lens opening, as well as on screen distance and other factors, variation in the character of the dot image, and contrast of the reproduction may be effected by control of the lens aperture with its length of exposure. (In the past this control has been made by the operator giving excessive exposures, having set the lens manually to respective apertures for each exposure. This requires the full attention and time of an experienced operator to operate a single process camera.) By the use of the instant invention, however, the operator may attend to other duties during the time of actual exposure, because the control device to be described turns the illumination on at the beginning of exposure, moves the lens diaphragm so that the proper proportion of exposure is given at different sizes of lens opening, gives a final adjustable exposure at the smallest lens opening selected, and turns off the illumination to terminate the exposure and stops itself.

It should be understood that in this specification, "exposure" refers not merely to the time that a subject is being imaged on the sensitized photographic plate, but includes a measure of light action determined by the size of aperture, and intensity of light reflected from the subject and focused upon the plate by the lens.

It is an object of the invention to provide a device which will cause predetermined exposures to be made, and which will simultaneously vary the aperture of the lens over a preselected range of diameter of the opening.

It is a further object to provide such a device which is ruggedly yet simply constructed, not liable to breakdowns, and which may be set into operation by a relatively unskilled person.

An aim of the invention is to coordinate the desired range of lens openings with the degree of enlargement or reduction of the particular copy being photographed, so that after being properly set and lighting adjusted for one scale of copying, such as equal size, the proper time of exposure and series of apertures for another scale of copy may be selected by merely setting the pointer to such scale marking on a dial.

An additional feature of the invention is that it may be used with manual control if desired, and will then indicate the proper lens opening and time of exposure required at that lens setting if a series of exposures at different apertures should be required rather than at the continuously varying series of apertures which the device gives in normal operation.

An object attained by the invention is that of permitting a series of exposures at continuously varying apertures followed by an exposure of preselected duration at a fixed aperture.

A further aim is to provide such a timing device in which the total period of exposure may be varied while maintaining the selected proportion of exposure at each aperture.

An additional attainment is the provision of means in such a device whereby the proportion of total exposure made at any portion of the range of aperture used may be readily preselected.

Additional features, objects, and advantages of the invention reside in the novel features, arrangements and combinations of parts as are described in the accompanying specification of a preferred form of the invention and shown in the accompanying drawings, wherein Figure 1 is a front elevation of an embodiment of the device in operative relation to a process camera objective and aperture diaphragm control.

Figure 2 is a side elevation thereof with parts in section.

Figure 3 is a rear elevation of the control device.

Figure 4 is a horizontal cross section thereof.

Figure 5 is a fragmentary top plan thereof.

Figure 6 is a schematic wiring of the electrical circuits controlled by the device.

Figure 7:
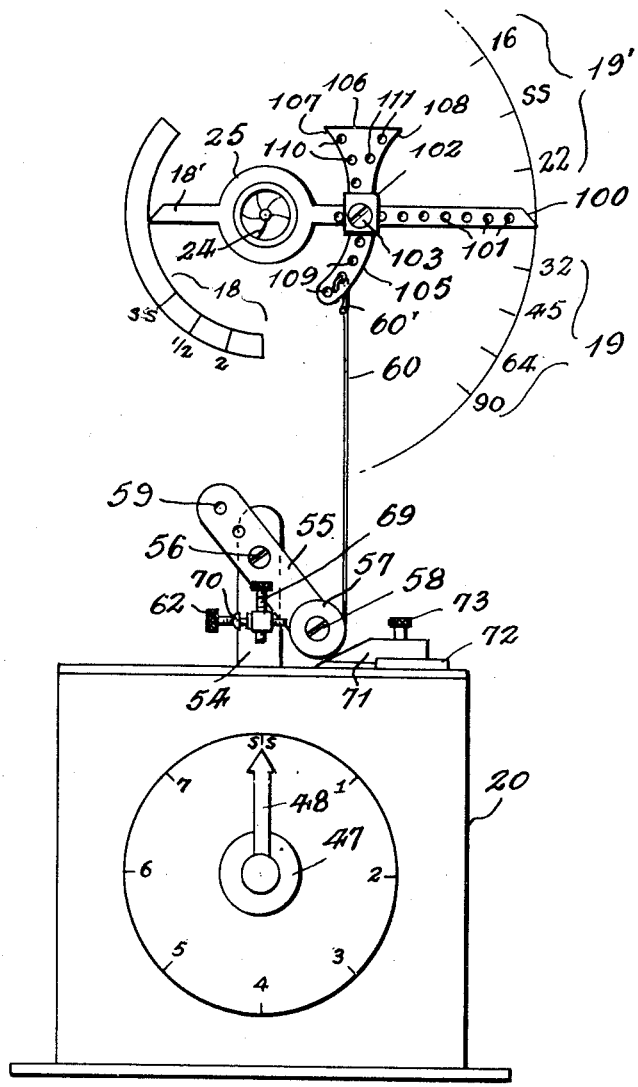
Figure 7 is a fragmentary view similar to Figure 1 illustrating a cable connection with the diaphragm lever.

There is illustrated a control device 20 adapted to operate in conjunction with photomechanical process equipment 21 which comprises an objective lens and mounting 23 which includes a variable aperture, illustrated as an iris diaphragm 24 operable by the rotatable ring 25 and pointer arm 25'. Associated therewith is a scale 19 of conventional "f" numbers and a scale 18 marked in degrees of enlargement, to be further described. The ring 25 has also a radial pointer 18' associated with the scale 18.

The control device 20 is housed in a casing which includes a base 26 which may be provided with a mounting flange 27, two end walls 28, a front panel 29, and a top 31.

Mounted upon the front panel inside of a gear train 33 the terminal gear 34 of which is meshed with the gear 35 fixed upon a clutch member 36. The terminal gear 34 of the train is made of sufficient thickness so that the gear 35 may slide longitudinally thereon incident to operation of the clutch member 36.

At a central position on the front panel 29 a bushing 37 is secured; slidably and rotatably mounted therein is a hollow shaft or sleeve 38 which extends outside the front wall 29 and has fixed thereon an operating disc 39 adapted to be grasped by the fingers for pulling the shaft 38 longitudinally and for rotating it. At the opposite end of the shaft 38 is mounted the clutch member 36 and associated gear 35 before referred to, which are freely rotatable on the shaft 38, and which are retained thereupon by a flange 40 on the end of the shaft outwardly of the clutch member 36. Urging the clutch member 36 longitudinally toward the flange 40 is a protractile helical spring 41 which is wound around the shaft and confined between the member 36 and the inner end of the bushing 37. Suitable washers or other anti-friction means may be provided between the rotatable member 36 and the spring 38 to reduce restraining torques. The bushing 37 is formed with a radial slot 42 extending around a portion of its circumference, and a longitudinal slot 43 extending from the central part of slot 42 inwardly in the direction of spring 41 but stopping short of the end of bushing 37. Engaged alternatively in the slots 42 and 43 is a pin 44 which is fixed in the clutch operating hollow shaft or sleeve 38. It may be seen that the pin 44 is urged to a seat at the end of the slot 43, but that when the disc 39 and sleeve 38 are pulled forward when releasing the clutch, the pin 44 will be carried to the slot 42 therein, on rotation of the shaft 38, it will be engaged and restrain shaft 38 against longitudinal return movement with respect to the bushing 37 when the disc 39 is released, thus holding the clutch out of engagement.

Journalled in the hollow shaft 38 and extending through the rear wall 30 where it is received by a suitable bearing and securing means 45, is an axle 46. Upon the forward end of the axle 46 is fixed an operating knob 47 and pointer 48 which extends radially beyond the disc 39 and may be set to any position of a dial 49 marked upon the front panel 29. Fixed upon the axle 46 and spaced a suitable distance from the rear wall 30 is a face cam disc 50, which is formed with a clutch element 51 aligned, and adapted to engage, with the clutch element 36 before mentioned. The face of the cam disc 50 which is presented to the rear wall is formed with a spiral cam which is illustrated as a channel 52, but which may be a rib, if desired, in other constructions.

The cam 52 as shown in Figure 3, is not a simple spiral cam in which the radial movement of the follower due to certain angular rotation of the cam plate would be the same at whatever portion of the cam it might be engaged. As shown it is preferably made in the form of an expotential spiral, the rate of radial movement relative to angular rotation becoming less as the follower approaches the axis of rotation of the cam 50.

Engaged in the cam channel 52 is a follower pin 53 carried by a slide bar 54 which is radial to the axle 46 and is carried in ways 55' which are fixed upon the rear wall 30. Rotation of the face cam 50 will thus cause radial motion of the slide 54. It may be seen that a revolution of the cam will move the slide 54 radially the radial distance between successive turns of the spiral—which is greater at the outer portions of the spiral than at the inner convolutions. Thus, a certain time of exposure established by the number of revolutions which the cam may make, may be accompanied by a variety of distances of travel of the radial slide, and, as will be further set forth, permits selection of the maximum and minimum lens openings regardless of the duration of exposure. The slide 54 is extended upwardly a suitable distance above the top 31 of the case and carries an arm or lever 55 upon a pivot pin 56, the arm 55 being extended downwardly and laterally of the case, and carrying upon its lower end a roller or spool 57 revolubly held in a pin 58. The arm 55 is provided with several holes 59 spaced longitudinally thereof and adapted to receive the removable pin 56, whereby the length of the lever arm between the slide 54 and the roller 57 may be varied through choice of the pivot hole 59.

A lens aperture operating cable 60 is attached to the roller spool 57 and is wrapped about it in a clockwise direction, leaving the spool at the side adjacent the slide 54 and being carried up and hooked in one of a series of longitudinally spaced holes 61 in the pointer arm 25' of the diaphragm operating ring 25. The spool 57 is frictionally held against rotation to such degree that upon vertical travel of the slide 54 the lens aperture diaphragm 24 will be actuated, but the length of cable may be varied by manual rotation of the spool 57 to take up the slack in the cable at any position of the slide 54 or the diaphragm 24.

The arm 55 is yieldably maintained in a downward position by a retractile spring 65 attached to an offset anchorage 66 on the arm 55, and engaged at its other end upon an anchorage 67 at a lower corner of the back wall 30. The spring 65 extending across the casing and pulling the arm 55 in toward the slide 54. Movement of the arm 55 toward the slide 54 is limited by a stop screw 62 engaged through a bracket 68 on the slide, which also serves as a mounting for a vertical downwardly projecting adjustable contact operating pin or screw 69 and associated lock 70, to be further referred to.

In the normal vertical path of travel of the roller 57 an inclined-plane stop 71 is mounted upon the top plate 31, being carried in ways 72 whereby it may be adjusted to and from the slide 54 and retained in adjusted position by a set screw 73. It will be seen that travel of the slide 54 downwardly will effect movement of the iris diaphragm 23 until the roller 57 encounters the inclined stop 71. The arm 55 and roller 57 will be moved sidewardly and slightly upward by rolling up the inclined plane. Stoppage of downward movement of the extremity of the arm 55 discontinues the pull of the cable 65, on the arm 25' and the diaphragm remains at fixed aperture during a further exposure as a result, and no further movement of the diaphragm will result from continued downward travel of the slide 54. Adjustment of the stop 71 determines the beginning of the stopping of movement of the diaphragm arm 25.

Fixed on the under side of the top plate 61 is a switch assembly 74, which includes normally closed contacts 75 and 76. The lower contact 76 is carried on a spring leaf 77 which is extended into the path of travel of the operating pin 69 carried upon the slide 54, and carries a push block 78 adapted to be engaged by the pin 69 as the slide 54 moves downwardly, thus separating the contacts 75 and 76. The position of the pin 69 may be adjusted longitudinally of the slide 54 as it is threadedly engaged in the mounting 68, and it may be secured in adjusted position by tightening the lock screw 70.

The electrical circuits controlled by the device and the accessory switches and controls are illustrated in Figure 6. A power supply line 80 is connected through a master two-pole fused switch 81 to a magnetic switch 82, which will be caused to make the circuit between the supply 81 and lighting equipment 83, or other exposure defining means, when the exposure is begun, and to automatically break said circuit at the end of the exposure. The drive motor 32 is connected in parallel with the lighting equipment 83 through a two-pole fused switch 84, whereby the motor which ordinarily operates simultaneously with the lights 83 may be discontinued if manual control be desired. A rheostat 85 is connected in series with motor 32 so that its speed may be varied, if desired, which will result in a longer or shorter total exposure while maintaining constant the percentage of said exposure made at each successive diaphragm opening. An alternative to the use of the rheostat for this purpose would be to provide changeable gears in the drive 33.

The magnetic switch 82 is actuated by a solenoid-holding coil 86 and armature 87 which includes an auxiliary contact 88 upon one pole of the switch.

Means for controlling actuation of the switch 82 through energizing of solenoid coil 86 include two manual operating stations 89 and 90, each of which includes a starting switch 91, of a push-button type, normally open, and a stop switch 92 normally closed; and the switch 74 operated by the control device 20. One terminal 93 of the solenoid coil 86 is connected to the opposite side of the supply line from the contact 88, at the output of switch 81. The other terminal 94 of the coil 86 is connected in series with the start switch 91 at station 89, to the opposite line at the output of switch 81. The terminal 94 is additionally connected in series with the stop switch 92 at station 89 and start switch 91, normally open circuit, at station 90 to said output line of switch 81. It will be seen that operation of either switch 91 to close the circuit will result in the coil being energized by power supply from switch 81, closing the contacts associated with the armature 87, and placing lights 83 and control unit 20 in operation. In order to hold the switch 82 in closed position during the exposure after release of push-button switch 91, the terminal 94 of the coil 86 is additionally placed in series with the two stop switches 92, the switch 74 of the control unit 20 and the auxiliary contact 88 of the switch 82 thus being placed in series with power supply by this circuit while the magnetic switch is closed. However, breaking this latter circuit at either stop switch 92 or the control switch 74 will de-energize the solenoid 86 and break the circuit to the lighting equipment 83 and control device 20.

The dial 49 is graduated to read in terms of the scale of the copy; in the present case the digits thereon represent tenths of reduction. Setting the pointer 48 to the corresponding dial position when making a copy of any degree of reduction has the effect of selecting total time of exposure and also of adjusting the maximum diaphragm opening used, to result in a properly exposed negative of the best dot image formation.

In operation of the device various modifications of adjustment may be made to alter the character of the image in the low dark portion of the image, or in the high light areas. Consequently, an individual requirement for a reproduction may be met, and an identical effect reproduced on a similar copy in the future; or a good standard adjustment for a run of work may be precisely made, and no further adjustments made during a run of similar copy, whether reproduction be made at the same scale or at various degrees of reduction, the pointer 48 being merely set to the proper point on the dial, or if enlargement pointer 18 is used.

When initially placed in operation, the intensity of lighting may be experimentally adjusted at a one to one scale of copy so that with the pointer set to "SS," (meaning same size) on the dial 49 at the start of the exposure, a proper range of densities will result in the finished negative. Maximum and minimum sizes of lens opening may be selected appropriate to the focal length used and the distance of the screen from the sensitized negative surface. Selection of maximum lens opening is made with the slide 54 set to its highest point of travel, when set at "SS" in this instance, by setting the lens aperture lever 25 as desired and taking up the slack in the cable 60 by means of the knob 62. Minimum size of aperture may be effected in several ways, preferably by turning the cam manually through that time of exposure to be given at varying diaphragm openings, which movement should cause the lens to be closed down to that aperture at which the fixed aperture exposure is to be given. The inclined stop 71 is now advanced to contact the roller 57, so that further downward movement of the slide 54 will cause the roller to ride up thereon, thus preventing further downward motion of the cable or further closing of the diaphragm. The cam 50 is now rotated through the time of exposure which is to be given as a final exposure, and the pin 69 is adjusted to break the circuit at the switch 74, which will de-energize the magnetic switch 86, terminate exposure and stop the control.

When actual exposure is to be made, the cam 50 will be driven by the motor 32 causing these lens settings and exposure times to be accurately coordinated and timed. Should the travel of the slide 54 in the required time not be precisely of the extent to effect desired movement of the diaphragm ring 25, the follower pin 53 may be engaged at a different portion of the spiral cam 52 by manually turning the shaft 46 (after disengaging the clutch 36), lowering the slide 54 if a lesser amount of travel is desired in a certain time, or raising it if a greater travel is desired.

The knob 47 may be loosened on the shaft 46 and the pointer 48 set to the "SS" or other degree of reproduction being used, which will "zero" the control for the camera lens being used. Additionally, the cable 60 may be reeved through one or another of the holes 61 in the diaphragm operating lever and pointer 25 to increase or decrease the radius of its attainment, so that the available movement of the cable will effect motion of the diaphragm between the desired maximum and minimum positions. This may be done as a final adjustment at any time as may be required by the character of the particular copy.

Having been adjusted for proper reproduction at one scale of copying, similar copy may be photographed at any other degree of reduction and the proper series of lens openings and exposures automatically given, merely by setting the pointer 48 to the corresponding position on the dial 49. This pointer is rotated in a counter-clockwise direction, raising the slide 54. When it is desired to give a long exposure for the detail of a copy, use the incline stop 71, which to stop movement of the diaphragm for a given amount of time while the lights are on.

Control of the character of dot image on the various tonal portions of the reproduction may be made by selecting the portion of total exposure made at the larger diaphragm openings relative to that given at the smaller openings, particularly the relative length of the last part of the exposure, which is made at the smallest lens diameter selected. If the slide 54 is operated by the outermost portion of the cam 52 it will be seen that a rather sudden closing action of the diaphragm with respect to time will result, and little exposure period given at the larger lens opening. The inclined stop 71 may be adjusted so that the size of the detail dots can be made any size desired. The smaller the lens opening with the correct exposure the smaller the dot. The high lights of the negative are controlled by giving more or less exposure with the large lens opening. Starting lower a more high light adjustment is made with cable to lens pointer.

Should manual operation and use of "one," "two" or "three" stop systems be desired, the lens opening may be set properly according to the scale of the copy by disengaging the clutch with the disc 39 and turning the pointer 48. On opening the switch 84, disconnecting the motor 32, the lights may be operated from either of the stations 89 or 90. The lights remaining on after pushing a start button 91, until one of the stop buttons 92 is operated.

The lever 25', the arm 55, the spool 57, stop block 71 and cable 60 may be termed a lost motion connection between the diaphragm and the diaphragm operating means, since motion of the operating member continues and the lever 25' stops although the operative connection of the parts through the cable continues.

On the switch case 74 there is shown a load leaf spring 93, the blade of which is extended in the path of the screw 69 of the slide 54, and closely over the push pin 78 of the switch blade 77. It will be seen that a slight depression of the spring 93 will open the switch 74 and stop the exposures. Operation of this spring for this purpose will therefore be effected by the screw 69 when the cam has moved the slide 54 to the desired lower limit. The timing of the circuit breaking function of the machine may be effected by loosening the lock screw and rotating the screw 69 so as to move it up or down on the slide 54 to delay or advance the opening of the switch 74. The spring 93 may be manually operated through the top 31 of the case, if desired, and so constitute a manual light extinguishing means in addition to the stop switches above described. It functions to eliminate possibility of operation of the switch 77 by the slide before loose connections or other play have been compensated for and to effect breaking of the circuit only when the cam 50 positively presses the pin 53 downwardly to the desired limit.

It will be appreciated that by the construction presented, after adjustment of the pointer on the dial it is only necessary to operate the starting switch, and thereafter all necessary functions which would ordinarily involve calculations and judgment are automatically performed by my timing device, the exposure begun, the necessary setting of the diaphragm effected at the proper times, and the exposures terminated after the proper period with the larger opening.

While there has been disclosed with great particularity a specific construction of apparatus embodying the invention and capable of performing the stated functions, it will nevertheless be understood that this is simply the best form of the device thus far constructed, and is purely exemplary, various changes in the construction, arrangement, combination of parts, substitution of materials, substitution of mechanical equivalents and modifications of design, being possible without departing from the spirit of the invention except as more particularly limited by the appended claims.

In Figure 7 there is illustrated a means for connecting the cable 60 to the diaphragm, adapted to improve the nicety of adjustment of the operation of the diaphragm. In this instance, the lower operating device including the slide 54 and arm 55 is as before described and the cable 60 is attached thereto in the same manner. In place of the single arm 25', however, a much longer arm 100 is provided on the operating ring 25 of the diaphragm, but it may be in the same relative radial location. It is preferably rectangular in cross section and is provided with a multiplicity of longitudinally spaced apertures or indentations 101 exposed at the front side, and engaged on this arm there is a close-fitting slide 102 having a set screw 103 engaged through its front side for alternative engagement in the apertures or indentations 101 to hold the slide in adjusted positions on the arm. The arm 100 may still serve as a pointer on a scale 19' similar to the one 19 before mentioned, calibrated in focal ratio numbers arranged at a greater radius than in the first instance. Likewise, from the opposite side of the diaphragm ring a shorter arm 18' as before operatively associated with a scale 18 calibrated in numbers indicating respective ratios of enlargement or reduction, or "SS" (same size).

The slide 102 is formed with a downward extension 105 in the shape of an arm curved toward the left in its outer part so that when the slide is at its left hand limit of sliding movement the arm 105 will be approximately concentric with the diaphragm ring 25. Extending upwardly from the slide there is an arm 106 which in addition to having a portion curved toward the left at its upper part also has a part curved toward the right, this being attained by forming the arm as a flat plate broadened toward its upper part suitably to afford left and right edges 107 and 108 of the desired curvature.

Throughout the length of the arm 105 there are longitudinally spaced apertures 109, arranged in a curved series, while adjacent each of the curved edges 107 and 108 there are respective series of apertures 110 and 111. The cable 60 has its anchor hook 60' engaged in one of the apertures of the slide extensions 105 and 106 alternatively. It will be seen that by connecting the cable to apertures toward the outer parts of the extensions 105 and 106 the motion produced in the arm 100 by vertical movement of the slide will have varying angular components of motion in proportion to given units of vertical motion of the slide, which may be availed of for operation of the diaphragm. Also, a greater refinement of adjustment of the cable connection at points radially spaced with respect to a projection of the cable across the arm 100 may be secured while still using anchorage apertures of substantial size and well spaced, so that manual change of the connection of the cable to the arm may be most easily effected. This permits finer gradations of the degree of movement of the diaphragm and sizes of aperture in relation to a given timing of the exposure and change of aperture.

The invention claimed is:

1. In a half tone exposure device, a variable aperture type diaphragm, a primary operating member, and operative connections between the latter and the diaphragm including a lost motion connection operative over a part of the movement only of the operating member, whereby the diaphragm remains at a fixed aperture for a time, and including an adjustable member operative to cause initiation of the lost motion relation between diaphragm and primary operating member at a predetermined part of movement of the device, variable at will.

2. In an exposure device of the character described, an iris diaphram having an operating lever, an operating member movable in a path at a substantial angle to the mean position of the operating lever, means to move the operating member from an initial position to a predetermined limit of movement, an arm pivoted on said operating member, means for yieldably maintaining the arm in a downward position, a take-up reel on the extremity of the arm, a cable anchored at one end on said operating lever and wound at its other end on said reel, means to hold said reel against unreeling, a surface element in the path of said reel being inclined and adjustable toward and away from the incident path of the reel under its movement initially with the operating member, the surface element being disposed at such angle to said path that the reel will roll thereon laterally, moving said arm so that the reel and arm will swing with elements of motion in the direction of said operating lever.

3. The structure of claim 2 wherein said arm has a plurality of longitudinally spaced apertures for alternative pivoting of the arm therein, said arm being extended laterally of the path of the operating member, said surface element being a slidable member adjustable toward and away from the said path of the operating member in the plane of the path of the pivotal movement of said arm, means to hold the surface element releasably at adjusted positions, and friction means to hold the reel against rotation except by said surface element and predetermined force.

EVELYN C. NEWICK,
*Executrix of the last Will and Testament of Richard P. Newick, Deceased.*

REFERENCES CITED

The following references are of record in the file of this patent:

UNITED STATES PATENTS

| Number | Name | Date |
|---|---|---|
| 2,149,743 | Newick | Mar. 7, 1939 |